US010761840B2

(12) United States Patent
Ashino

(10) Patent No.: US 10,761,840 B2
(45) Date of Patent: Sep. 1, 2020

(54) SOFTWARE ANALYSIS DEVICE, SOFTWARE ANALYSIS METHOD, AND RECORDING MEDIUM

(71) Applicant: NEC Corporation, Minato-ku, Tokyo (JP)

(72) Inventor: Yuki Ashino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 206 days.

(21) Appl. No.: 15/777,962

(22) PCT Filed: Nov. 17, 2016

(86) PCT No.: PCT/JP2016/084106
§ 371 (c)(1),
(2) Date: May 22, 2018

(87) PCT Pub. No.: WO2017/094519
PCT Pub. Date: Jun. 8, 2017

(65) Prior Publication Data

US 2018/0349248 A1 Dec. 6, 2018

(30) Foreign Application Priority Data

Nov. 30, 2015 (JP) ................................ 2015-233604

(51) Int. Cl.
*G06F 8/74* (2018.01)
*G06F 11/36* (2006.01)
(Continued)

(52) U.S. Cl.
CPC .................. *G06F 8/74* (2013.01); *G06F 8/75* (2013.01); *G06F 9/46* (2013.01); *G06F 11/302* (2013.01);
(Continued)

(58) Field of Classification Search
CPC .... G06F 11/3409; G06F 11/302; G06F 11/36; G06F 8/75; G06F 8/74; G06F 9/46; G06F 9/45533
See application file for complete search history.

(56) References Cited

U.S. PATENT DOCUMENTS

2007/0067755 A1* 3/2007 Hinchey .................. G06F 8/10 717/135
2011/0047414 A1 2/2011 Kudo et al.
(Continued)

FOREIGN PATENT DOCUMENTS

JP 2004-126866 A 4/2004
JP 2011-523127 A 8/2011
(Continued)

OTHER PUBLICATIONS

International Search Report for PCT Application No. PCT/JP2016/084106, dated Jan. 24, 2017.
(Continued)

*Primary Examiner* — Jacob D Dascomb

(57) ABSTRACT

A software analysis device which efficiently analyzes a computer environment in which software is capable of running are provided. The software analysis device sets at least two configurations to a virtual machine, executes processing at a timing on individual configuration, determines whether or not results of the processing satisfy a predetermined criterion, and determines that the software is executed when the results satisfies the predetermined condition.

10 Claims, 21 Drawing Sheets

(51) Int. Cl.

| | |
|---|---|
| ***G06F 9/46*** | (2006.01) |
| ***G06F 8/75*** | (2018.01) |
| ***G06F 11/30*** | (2006.01) |
| ***G06F 11/34*** | (2006.01) |
| *G06F 9/455* | (2018.01) |

(52) U.S. Cl.

CPC .......... *G06F 11/3409* (2013.01); *G06F 11/36* (2013.01); *G06F 9/45533* (2013.01)

(56) References Cited

U.S. PATENT DOCUMENTS

| | | | | |
|---|---|---|---|---|
| 2011/0321018 | A1* | 12/2011 | Tatsubori | G06F 8/53 717/137 |
| 2012/0304244 | A1 | 11/2012 | Xie et al. | |
| 2014/0304815 | A1 | 10/2014 | Maeda | |
| 2016/0253189 | A1* | 9/2016 | Teuwen | G06F 9/455 726/22 |

FOREIGN PATENT DOCUMENTS

| | | | |
|---|---|---|---|
| JP | 5389734 | B2 | 1/2014 |
| JP | 5540160 | B2 | 7/2014 |
| JP | 2014-519113 | A | 8/2014 |
| JP | 2015-165362 | A | 9/2015 |

OTHER PUBLICATIONS

English translation of Written opinion for PCT Application No. PCT/JP2016/084106.

* cited by examiner

Fig.3

| COMPONENT' S NAME | SETTING VALUE |
|---|---|
| THE NUMBER OF PROCESSORS | 4 |
| PROCESSOR' S NAME | AAA |
| MEMORY' S VOLUME | 256 |
| IP ADDRESS | 1.2.3.4 |
| DISPLAY RESOLUTION (VERTICAL) | 480 |
| DISPLAY RESOLUTION (HORIZONTAL) | 640 |
| OS | BBB |
| CLOCK FREQUENCY | 3 |

Fig.4

| SOFTWARE'S NAME | FILE | FILE SETTING PROCEDURE |
|---|---|---|
| A | AAA.exe<br>BBB.dll<br>CCC.dll | AAA.exe IS STORED AS AAA.exe IN "¥111¥222¥333".<br>BBB.dll IS STORED IN "¥111".<br>... |

Fig.5

| SOFTWARE' S NAME | PROCESSING TO BE EXECUTED | TIMING OF EXECUTION-PROCESSING | DETERMINATION CONDITION |
|---|---|---|---|
| A | CHECK RESPONSE TIME OF VIRTUAL MACHINE | 10 MINUTES AFTER VIRTUAL MACHINE HAS STARTED | IS RESPONSE TIME 3 SECONDS OR LONGER? |

Fig.8

| COMPONENT'S NAME | KIND OF VALUE | INITIAL VALUE | MAXIMUM VALUE | VALUE CANDIDATE | STEP | SETTING ROW NUMBER IN SETTING INFORMATION |
|---|---|---|---|---|---|---|
| THE NUMBER OF PROCESSORS | INTEGER | 1 | 8 | – | 1 | 1 |
| MEMORY'S VOLUME | INTEGER | 512 | 4096 | – | 256 | 3 |
| IP ADDRESS | 32 BITS | 1. 0. 0. 1 | 1. 0. 255. 255 | – | 1 | 4 |
| DISPLAY RESOLUTION (VERTICAL) | INTEGER | 640 | 2048 | – | 128 | 5 |
| DISPLAY RESOLUTION (HORIZONTAL) | INTEGER | 480 | 2048 | – | 128 | 6 |
| PROCESSOR'S NAME | CHARACTER STRING | – | – | AAA<br>BBB | 1 | 2 |
| OS | HDD IMAGE | – | – | OS_A<br>OS_B<br>OS_C | 1 | 7 |

Fig.9

| ITEM | CONTENT |
|---|---|
| SOFTWARE'S NAME | A |
| OS | OS_A, OS_B |
| THE NUMBER OF PROCESSORS | 2,3,4 |
| DISPLAY RESOLUTION (VERTICAL) | 480 |
| DISPLAY RESOLUTION (HORIZONTAL) | 640 |

Fig.12

| SOFTWARE' S NAME | FILE | FILE SETTING PROCEDURE |
|---|---|---|
| A | AAA. exe<br>BBB. dll<br>CCC. dll | AAA.exe IS STORED AS AAA.exe IN "¥111¥222¥333".<br>BBB.dll IS STORED IN "¥111".<br>* * * |
| B | XX. exe | XX.exe IS STORED IN "¥333". |
| C | Y1. exe<br>Y2. dll | Y1.exe IS STORED IN "¥ss".<br>* * * |
| D | ZZZZ. exe | ZZZZ.exe IS STORED IN "¥Z1¥Z2¥Z3". |
| E | E. exe | E.exe IS STORED IN "¥www". |
| F | FFFF. exe | FFFF.exe IS STORED IN "¥12345". |
| * * * | * * * | * * * |

Fig.13

| SOFTWARE'S NAME | EXECUTION-PROCESSING | TIMING OF EXECUTION-PROCESSING | DETERMINATION-CRITERION |
|---|---|---|---|
| A | CHECK RESPONSE TIME OF VIRTUAL MACHINE | 10 MINUTES AFTER VIRTUAL MACHINE HAS STARTED | IS RESPONSE TIME 3 SECONDS OR LONGER? |
| B | DUMP MEMORY AND LIST NAME OF PROCESS | 60 MINUTES AFTER VIRTUAL MACHINE HAS STARTED | IS XX.exe PRESENT AS EXECUTION PROCESSING? |
| C | DECIPHER COMMUNICATION CONTENT | VIRTUAL MACHINE IS COMMUNICATING | IS CHARACTER STRING OF user = JJJ PRESENT? |
| D | DUMP MEMORY AND CHECK AVAILABLE PORT NUMBER | 20 MINUTES AFTER VIRTUAL MACHINE HAS STARTED | IS 3360$^{th}$ PORT OPEN? |
| E | START DEBUGGER PROGRAM | 1 MINUTE AFTER VIRTUAL MACHINE HAS STARTED | IS E.exe PRESENT AS EXECUTION-PROCESSING? |
| F | DUMP MEMORY | VIRTUAL MACHINE STARTS COMMUNICATION | IS CHARACTER STRING "CRYPT ENGINE" PRESENT IN MEMORY? |
| ... | ... | ... | ... |

Fig.18

| COMPONENT'S NAME | COMPONENT'S MODE |
|---|---|
| CLOCK FREQUENCY | 5,10,15,20,··· |

Fig.19

| COMPONENT'S NAME | COMPONENT'S MODE |
|---|---|
| CLOCK FREQUENCY | 5,10,15,20,··· |
| MEMORY VOLUME | 1,2,3,4,··· |
| PROCESSOR'S NAME | A1,A2,A3,··· |

SOFTWARE ANALYSIS DEVICE, SOFTWARE ANALYSIS METHOD, AND RECORDING MEDIUM

This application is a National Stage Entry of PCT/JP2016/084106 filed on Nov. 17, 2016, which claims priority from Japanese Patent Application 2015-233604 filed on Nov. 30, 2015, the contents of all of which are incorporated herein by reference, in their entirety.

TECHNICAL FIELD

The present invention relates to a software analysis device and the like capable of efficiently analyzing a situation in which software can run.

BACKGROUND ART

A static analysis program analyzes a source program without executing an object program relating computer software (hereinafter referred to as "software") and thus analyzes a fault or the like in the software. The static analysis program provides support information for developing a software by pointing out a part (flow) determined as a fault in a source program.

For example, PTL 1 discloses an analysis device that outputs a warning message, based on a result of analyzing a source program by using a static analysis program. The analysis device generates a file including a result of analyzing a source program relating to each of a plurality of versions, and generates a difference between the files. Next, the analysis device outputs a warning message associated with the generated difference.

On the other hand, when a source program of a software is not disclosed, reverse engineering has been known as a technique for analyzing the software. In the reverse engineering, disassembling an object program of software clarifies a function of the software. In addition, a measure against malware indicating software that executes an illegal action can be realized by reverse engineering on the malware.

For example, PTL 2 discloses a technology for extracting malware from software containing the malware. In addition, PTLs 3 and 4 disclose a technology for analyzing software by analyzing the software in a virtual machine.

PTL 2 discloses an extraction device that extracts malware from software, based on a change in a region of a memory accessed by a process executed by the software.

PTL 3 discloses a verification service providing system for verifying software by using a program and a verification tool for analyzing software. The providing system introduces an analysis tool for analyzing a program into a virtual machine and analyzes software in the virtual machine by using the introduced analysis tool.

PTL 4 discloses a software analysis device that determines, based on session information or the like output in a virtual machine where a malware candidate sample runs, whether or not the sample is malware. When the software analysis device determines that the sample is malware, the software analysis device outputs a signature identifying the malware.

The extraction device disclosed in the above-described PTL 2 extracts a candidate of an original code included in software by executing the software. The extraction device checks a range of memory address accessed by the extracted candidate of an original code, and determines whether or not the candidate of an original code is an actual original code, based on whether or not a change rate of the above-described address range satisfies a predetermined condition.

CITATION LIST

Patent Literature

PTL 1: Japanese Published Unexamined Patent Application No. 2014-126866

PTL 2: Japanese Patent Publication No. 5389734

PTL 3: Japanese Patent Publication No. 5540160

PTL 4: Japanese Published Unexamined Patent Application No. 2014-519113

SUMMARY OF INVENTION

Technical Problem

For example, the analysis device disclosed in PTL 1 analyzes a source program of software and can verify whether or not the software runs in a certain machine environment. The machine environment indicates a mode that combines components of hardware, software installed in a machine, and the like.

However, even when software is analyzed by using any of the above-described devices, processing of verifying an action of the software requires a high degree of throughput (computational amount). For example, since an analysis of a source program is realized by an analysis of individual statement, the analysis work requires a high degree of throughput. Further, when reverse engineering is performed on an object program, a great amount of labor (work, throughput) is required to analyze a result obtained by disassembling.

Thus, one of main objects of the present invention is to provide a software analysis device and the like capable of efficiently analyzing a machine environment in which software can run.

Solution to Problem

In order to achieve the above-described object, as an aspect of the present invention, software analysis device including:

configuration setting means for setting, in accordance with setting information indicating that one mode is set to a configuration of a virtual machine, the configuration of the virtual machine including at least a storage unit where a file required to execute target software is stored in a predetermined storage region;

starting means for starting the set virtual machine;

determination means for executing, based on determination information, an execution-processing to be executed at a timing, determining whether or not an executed result satisfies a determination-criterion, determining that the target software is executed in the virtual machine when the determination-criterion is satisfied, and determining that the target software is not executed in the virtual machine when the determination-criterion is not satisfied, the determination information where execution-processing outside the virtual machine in processing of determining whether or not the target software is executed, the timing of the execution-processing, and the determination-criterion indicating a condition of the determination are associated with each other; and control means for controlling the configuration setting means to set, among set of setting information where modes on which configurations may take is arranged in order of successive change, a certain mode to the setting information, controlling the configuration setting means to set, based on the set of setting information, a next mode of the certain mode to the setting information, and outputting, when a determination result from the determination means relating to the certain mode and a determination result from the determination means relating to the next mode are different with each other, the certain mode or the next mode.

In addition, as another aspect of the present invention, software analysis method including:

setting, in accordance with setting information indicating that one mode is set to a configuration of a virtual machine, the configuration of the virtual machine including at least a storage unit where a file required to execute target software is stored in a predetermined storage region;

starting the set virtual machine;

executing, based on determination information, an execution-processing to be executed at a timing, determining whether or not an executed result satisfies a determination-criterion, determining that the target software is executed in the virtual machine when the determination-criterion is satisfied, and determining that the target software is not executed in the virtual machine when the determination-criterion is not satisfied, the determination information where execution-processing outside the virtual machine in processing of determining whether or not the target software is executed, the timing of the execution-processing, and the determination-criterion indicating a condition of the determination are associated with each other; and controlling to set, among set of setting information where modes on which configurations may take is arranged in order of successive change, a certain mode to the setting information, controlling to set, based on the set of setting information, a next mode of the certain mode to the setting information, and outputting, when a determination result relating to the certain mode and a determination result relating to the next mode are different with each other, the certain mode or the next mode.

In addition, as another aspect of the present invention, a software analysis program, that realize a computer, including:

a configuration setting function for setting, in accordance with setting information indicating that one mode is set to a configuration of a virtual machine, the configuration of the virtual machine including at least a storage unit where a file required to execute target software is stored in a predetermined storage region;

a starting function for starting the set virtual machine;

a determination function for executing, based on determination information, an execution-processing to be executed at a timing, determining whether or not an executed result satisfies a determination-criterion, determining that the target software is executed in the virtual machine when the determination-criterion is satisfied, and determining that the target software is not executed in the virtual machine when the determination-criterion is not satisfied, the determination information where execution-processing outside the virtual machine in processing of determining whether or not the target software is executed, the timing of the execution-processing, and the determination-criterion indicating a condition of the determination are associated with each other; and a control function for controlling the configuration setting function to set, among set of setting information where modes on which configurations may take is arranged in order of successive change, a certain mode to the setting information, controlling the configuration setting function to set, based on the set of setting information, a next mode of the certain mode to the setting information, and outputting, when a determination result from the determination function relating to the certain mode and a determination result from the determination function relating to the next mode are different with each other, the certain mode or the next mode.

Furthermore, the object is also realized by a computer-readable recording medium, which records the software analysis program.

Advantageous Effects of the Invention

A software analysis device and the like according to the present invention can efficiently analyze a machine environment in which software can run.

BRIEF DESCRIPTION OF DRAWINGS

FIG. 3 is a diagram schematically illustrating one example of a configuration of setting information.

FIG. 4 is a diagram schematically illustrating one example of a configuration of software information.

FIG. 5 is a diagram schematically illustrating one example of a configuration of determination information.

FIG. 8 is a diagram schematically illustrating one example of a configuration of set of setting information.

FIG. 9 is a diagram schematically illustrating one example of setting information displayed on a display unit.

FIG. 12 is a diagram schematically illustrating one example of a configuration of a software information set.

FIG. 13 is a diagram schematically illustrating one example of a configuration of a determination information set.

FIG. 18 is a diagram schematically illustrating one example of a set of setting information.

FIG. 19 is a diagram schematically illustrating one example of a set of setting information.

DESCRIPTION OF EXAMPLE EMBODIMENTS

Next, example embodiments of the present invention will be described in detail with reference to drawings.

First Example Embodiment

Figure 1:
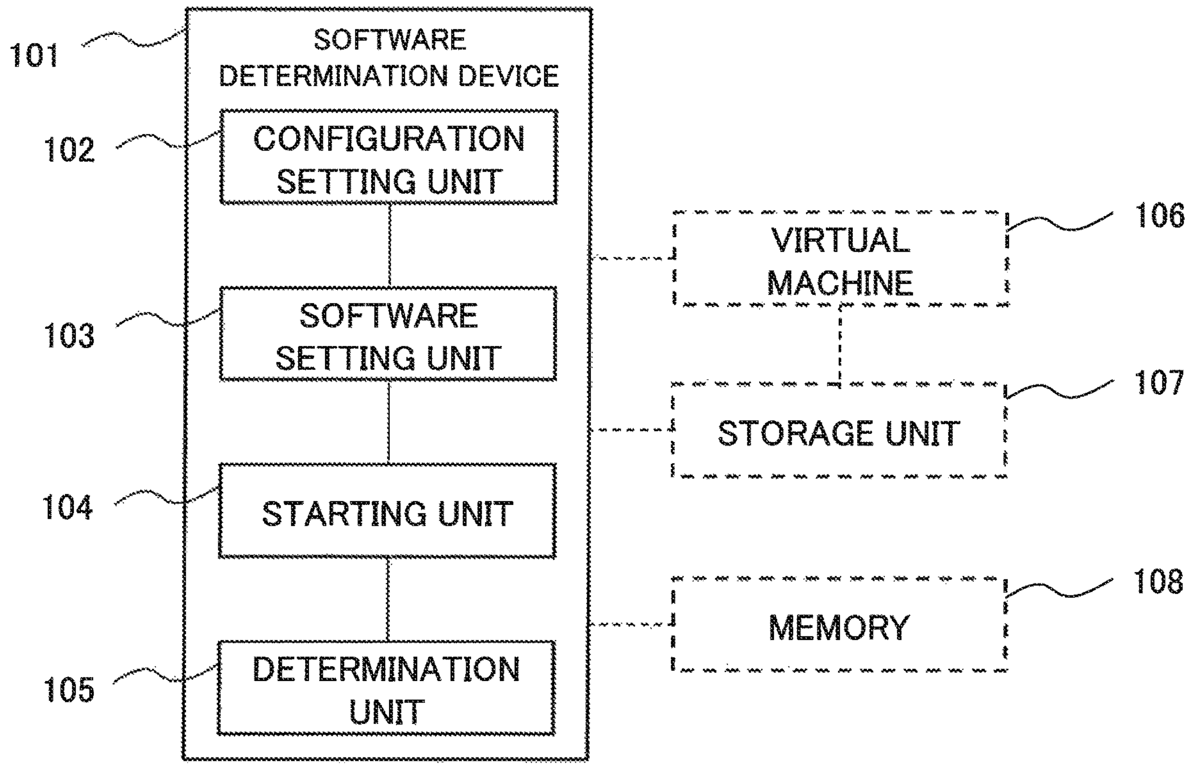
FIG. 1 is a block diagram illustrating a configuration of a software determination device according to a first example embodiment of the present invention.
Figure 2:
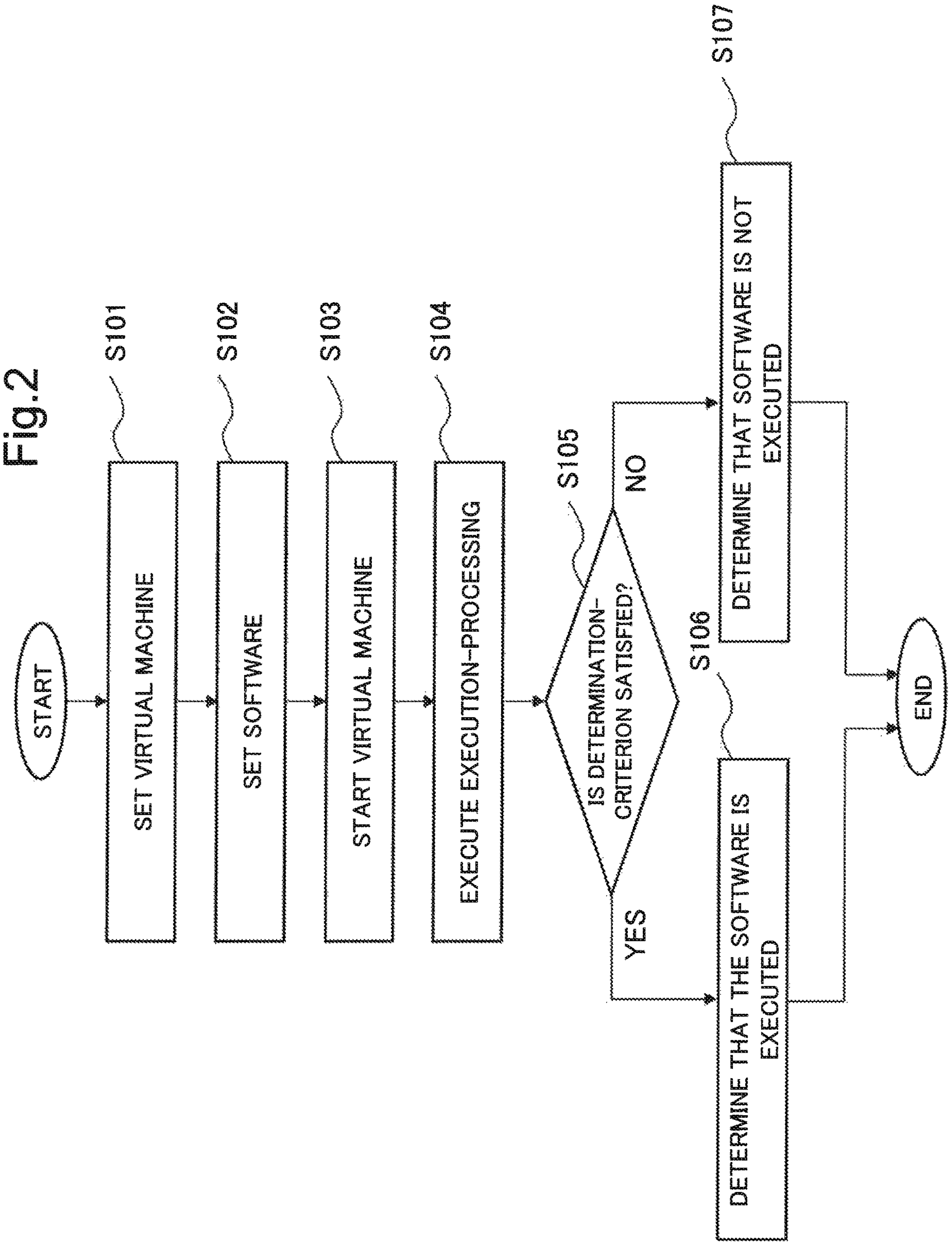
FIG. 2 is a flowchart illustrating a flow of processing in the software determination device according to the first example embodiment.

A configuration of a software determination device according to a first example embodiment of the present invention and processing in the software determination device will be described in detail with reference to FIGS. 1 and 2. FIG. 1 is a block diagram illustrating a configuration of a software determination device 101 according to the first example embodiment of the present invention. FIG. 2 is a flowchart illustrating a flow of processing in the software determination device 101 according to the first example embodiment.

The software determination device 101 according to the first example embodiment includes a configuration setting unit (configuration setter) 102, a software setting unit (software setter) 103, a starting unit (starter) 104, and a determination unit (determiner) 105.

The software determination device 101 is communicably connected to a virtual machine 106. The virtual machine 106 includes a storage unit 107 capable of storing information in a non-transitory manner. Data about processing executed in the virtual machine 106 is stored in a main memory (hereinafter referred to as a "memory") 108. The data about processing is, for example, processing data (information) as a target of processing by software, an execution program indicating the software, and the like.

The configuration setting unit 102 sets the virtual machine 106 based on setting information as exemplified in FIG. 3 in response to three pieces of information, that is the setting information as exemplified in FIG. 3, software information as exemplified in FIG. 4, and determination information as exemplified in FIG. 5 (step S101). In other words, the configuration setting unit 102 sets the virtual machine 106 based on the provided information (for example, setting information) in response to the setting information, the software information, and the determination information. FIG. 3 is a diagram schematically illustrating one example of a configuration of the setting information. FIG. 4 is a diagram schematically illustrating one example of a configuration of the software information. FIG. 5 is a diagram schematically illustrating one example of a configuration of the determination information. The setting information, the software information, and the determination information will be described with reference to FIGS. 3 to 5 and, then, processing illustrated in FIG. 2 will be described in detail.

The setting information will be described with reference to FIG. 3. The setting information is information where a name (an identifier) of a component included in the virtual machine 106 and a setting value for the component are associated with each other. In other words, the setting information indicates base information for setting one mode of a configuration of the virtual machine. With reference to the example illustrated in FIG. 3, the setting information includes, for example, information where a name "the number of processors" and a setting value "4" are associate with each other. This indicates information for setting a number of processors in the virtual machine 106 to four. Further, the setting information includes information where a name "display resolution (vertical)" and a setting value "480" are associated with each other. This indicates that a vertical resolution in a display in the virtual machine 106 is set to 480. However, IP indicates the Internet Protocol. OS indicates an operating system.

Next, the software information will be described with reference to FIG. 4. The software information is information where files relating to software to be a determination target (hereinafter referred to as "target software") and a setting procedure of setting the files in the storage unit 107 are associated with each other. In the software information, the file may be associated with a name (an identifier) of the target software in addition to the setting procedure. With reference to the example illustrated in FIG. 4, the software information includes three items as follows. In other words, Name "A", Files "AAA.exe, BBB.dll, CCC.dll", and Setting procedure ""AAA.exe" is stored as "AAA.exe" in "¥111¥222¥333". BBB.dll is stored in "¥111"".

Herein, "¥" corresponds (is equivalent) to a so-called backslash on the English keyboard. "¥" indicates a symbol for denoting a directory (folder) indicating a place in which a file or the like is stored.

The software information exemplified in FIG. 4 indicates that software "A" (target software in this example) includes a file "AAA.exe", a file "BBB.dll", and a file "CCC.dll". The file may be, for example, an input-output file to which the software "A" refers instead of a file included in the software A. Further, the setting procedure indicates that "AAA.exe" is stored as the name "AAA.exe" in "¥111¥222¥333" and "BBB.dll" is further stored in "¥111" in the storage unit 107, and thus the virtual machine 106 executing the software "A" can be set.

Next, the determination information will be described with reference to FIG. 5. The determination information is information where execution-processing to be executed in the virtual machine 106, timing of the execution-processing, and a determination-criterion for determining whether or not target software is executed based on a result of the execution-processing are associated with each other. In the determination information, a software's name may be further associated with the execution-processing, the timing, and the determination-criterion. The determination-criterion in the determination information indicates a reference condition for determining whether or not target software is executed in the virtual machine 106.

For example, in a case of the example illustrated in FIG. 5, the determination information indicates determination information for the software A. In this case, processing of determining whether or not the software A is executed in the virtual machine 106 can be achieved by, for example, executing Item 1 and Item 2 indicated as follows in order. In other words, (Item 1) Measure response time to the virtual machine 106 at ten minutes later after the virtual machine 106 has started (a column "execution-processing" and a column "timing of execution-processing" in FIG. 5), and (Item 2) Determine that the software A is executed when the measured response time is three seconds or longer. Determine that the software A is not executed when the measured response time is less than three seconds (a column "determination-criterion" in FIG. 5).

In each of the example embodiments of the present invention, it is assumed that execution-processing included in the determination information is processing executed to be targeted for the virtual machine 106. In other words, it is assumed that the execution-processing is not processing executed in the virtual machine 106 and is processing of monitoring the virtual machine 106 from the outside. For example, the execution-processing is processing of measuring response time of the virtual machine 106, dumping a memory 108, reading a transmitted and received content of communication relating to the virtual machine 106, or the like.

With reference to the examples illustrated in FIGS. 2 to 5, the software determination device 101 according to the present example embodiment will be described in detail. When the configuration setting unit 102 receives the setting information exemplified in FIG. 3, the configuration setting unit 102 sets, for example, the number of processors to four in accordance with the received setting information in step S101 in order to set a configuration of the virtual machine 106.

Next, the software setting unit 103 sets, based on a procedure included in the software information exemplified in FIG. 4, files associated with the procedure in the storage unit 107 being one of the components of the virtual machine 106 (step S102). The virtual machine 106 reads the file set by the software setting unit 103 from the storage unit 107 and executes the read files. As a result, the virtual machine 106 can start the target software.

Next, the starting unit 104 starts the virtual machine 106 (step S103). The starting unit 104 may further start the target software set in the software setting unit 103. When the software information is information about malware, the starting unit 104 may be set not to start the target software. In this case, the target software starts in response to startup of the virtual machine 106.

Next, the determination unit 105 executes, at timing included in the determination information, execution-processing associated with the timing based on the determination information exemplified in FIG. 5 (step S104). For example, the execution-processing is processing of measuring response time of the virtual machine 106, processing of dumping the memory 108, processing of reading a transmitted and received content of communication for the virtual machine 106, or the like. For example, when the software "A" has a function of communicating with the outside, the execution-processing is processing of measuring response time of the software A which responds to a signal that has been transmitted to the software A.

Next, the determination unit 105 determines whether or not the target software is executed in the virtual machine 106 based on a result of the execution-processing and a determination-criterion associated with the execution-processing (step S105). When the determination unit 105 determines that the result of the execution-processing satisfies the determination-criterion (YES in step S105), the determination unit 105 determines that the target software is executed (step S106). When the determination unit 105 determines that the result of the execution-processing does not satisfy the determination-criterion (NO in step S105), the determination unit 105 determines that the target software is not executed (step S107).

In a case of the determination information exemplified in FIG. 5, the determination unit 105 measures response time of the virtual machine 106 at ten minutes later after the virtual machine 106 has started in step S103. Next, the determination unit 105 determine whether or not the target software is executed in the virtual machine 106 based on determining whether or not the measured response time is three seconds or longer.

When the determination information includes a plurality of execution-processing (timing, determination-criterion) for one target software, the determination unit 105 executes the processing indicated in steps S104 to S107 for individual execution-processing.

Next, advantageous effects of the software determination device 101 according to the first example embodiment will be described.

The software determination device 101 can easily verify an action of target software. The reason is that the software determination device 101 starts the virtual machine 106 set based on setting information without analyzing a source program, and determines whether or not the target software is executed based on a result of execution-processing after the startup or the like.

As described in "Background Art", processing of analyzing a source program requires many processing. In contrast, a determination processing of determining whether or not target software is executed based on an execution result or the like is processing executed by determining whether or not a certain determination-criterion is satisfied, and thus the processing does not require many processing. Therefore, the software determination device 101 according to the present example embodiment can easily verify an action of target software.

Since the software determination device 101 performs execution-processing from the outside of the virtual machine 106, analysis software for analyzing whether or not target software is executed is not set in the virtual machine 106. For example, when the analysis software affects processing for target software to be a determination target, the target software to be the determination target cannot be correctly determined. Therefore, the software determination device 101 according to the present example embodiment can more correctly verify an action of the target software even when the action of the target software varies depending on the presence or absence of the analysis software in the virtual machine 106.

It is assumed for convenience of description that the software setting unit 103 sets the storage unit 107 in the virtual machine 106 based on the software information as exemplified in FIG. 4 in the above-described description. However, when software in the software information exemplified in FIG. 4 has been previously set in the storage unit 107, the software setting unit 103 may not need to store the software of the software information in the storage unit 107. In this case, the software determination device 101 according to the present example embodiment includes the configuration setting unit 102, the starting unit 104, and the determination unit 105. When the configuration setting unit 102 sets the virtual machine 106 based on the setting information (exemplified in FIG. 3), the starting unit 104 starts the virtual machine 106 including the storage unit 107 in which software is set as a component. The determination unit 105 determines whether or not target software is executed in the virtual machine 106 by executing the processing indicated in steps S104 to S107 in FIG. 2.

Second Example Embodiment

Next, a second example embodiment of the present invention based on the above-described first example embodiment will be described.

In the following description, while a characteristic part according to the present example embodiment will be mainly described, the same configuration as that of the above-described first example embodiment is denoted by the same reference number, in such a way that redundant description will be omitted.

Figure 6:
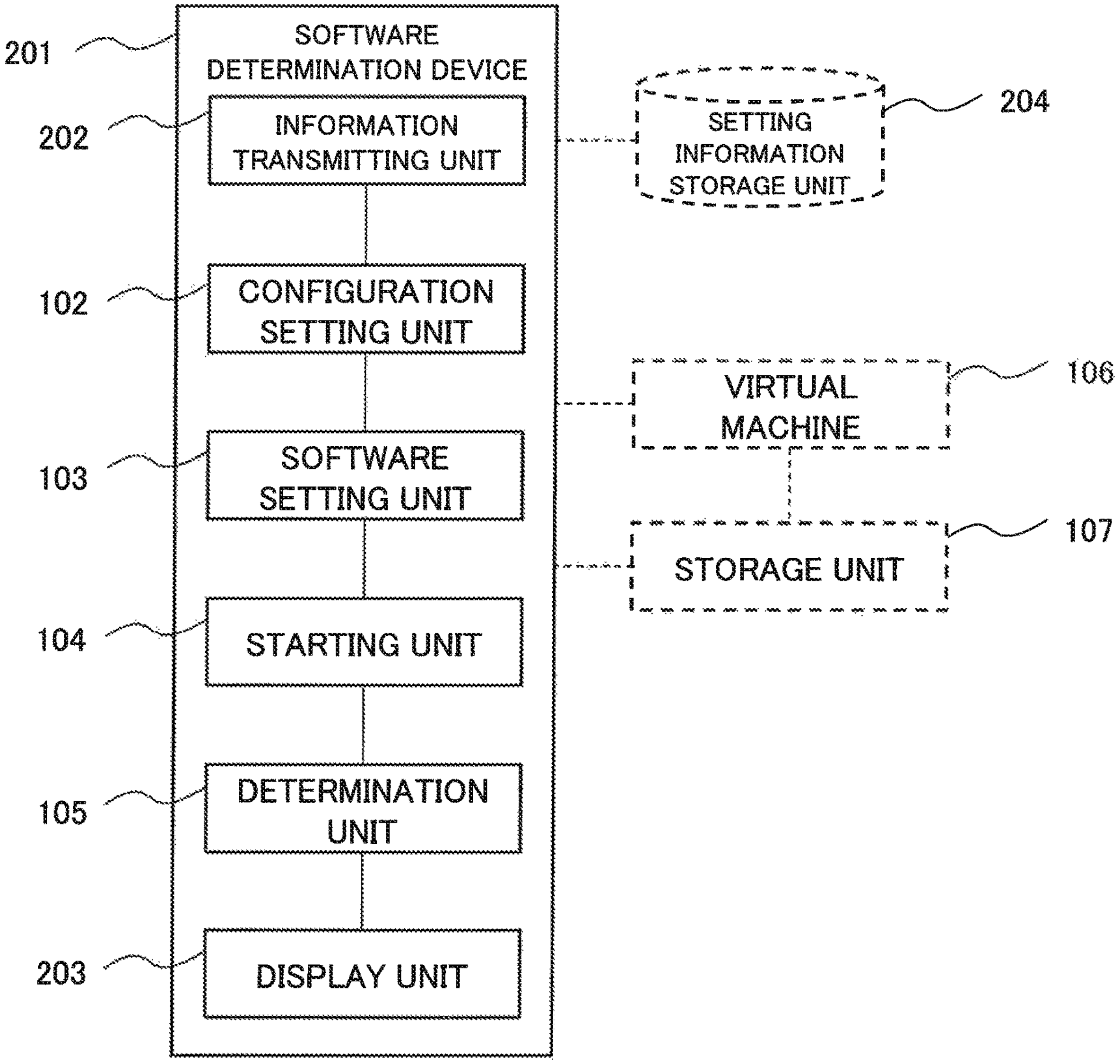
FIG. 6 is a block diagram illustrating a configuration of the software determination device according to a second example embodiment of the present invention.
Figure 7:
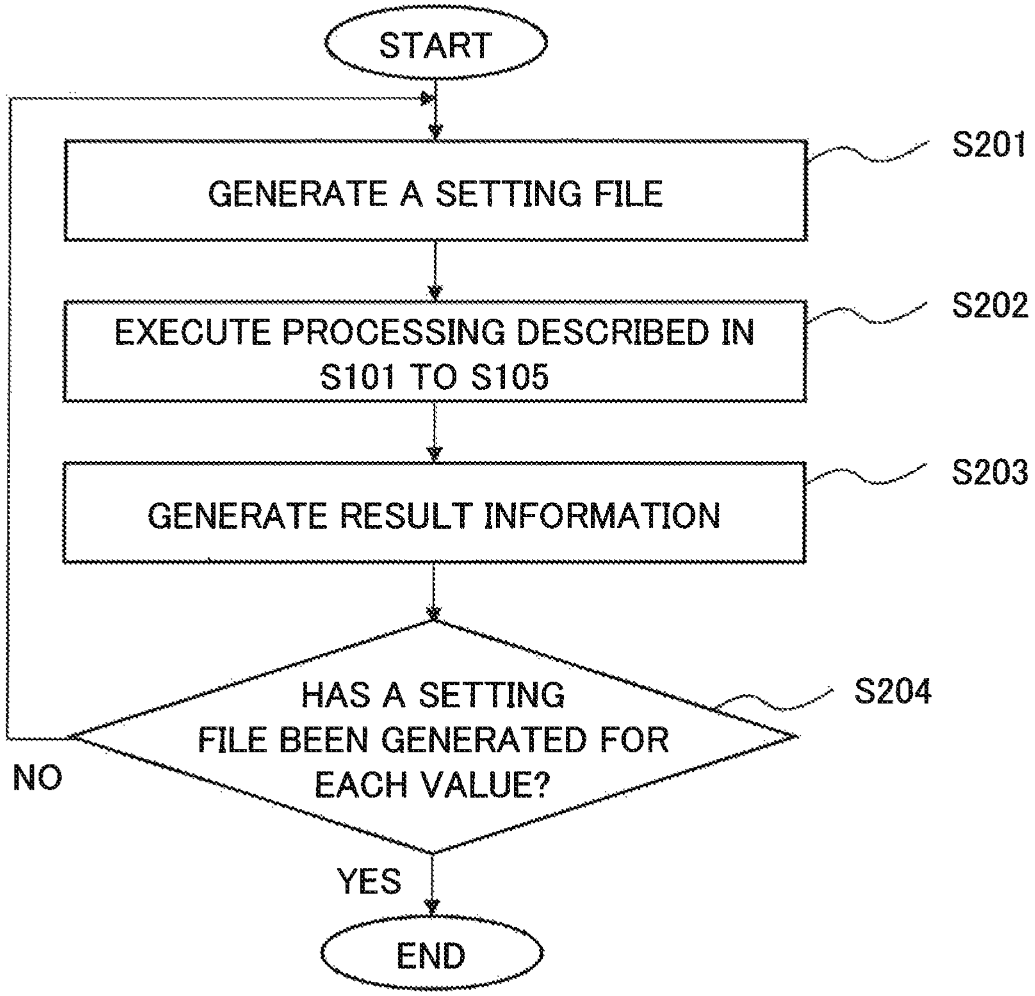
FIG. 7 is a flowchart illustrating a processing flow in the software determination device according to the second example embodiment.

With reference to FIGS. 6 and 7, a configuration of a software determination device 201 according to the second example embodiment and processing in the software determination device 201 will be described. FIG. 6 is a block diagram illustrating the configuration of the software determination device 201 according to the second example embodiment of the present invention. FIG. 7 is a flowchart illustrating a processing flow in the software determination device 201 according to the second example embodiment.

The software determination device 201 according to the second example embodiment includes a configuration setting unit (configuration setter) 102, a software setting unit (software setter) 103, a starting unit (starter) 104, a determination unit (determiner) 105, an information transmitting unit (information transmitter) 202, and a display unit 203. The software determination device 201 may further include a setting information storage unit 204.

In the following description, the information transmitting unit may be referred to as an "information providing unit (information provider)" for convenience of description.

The software determination device 201 is communicably connected to a virtual machine 106.

First, the information transmitting unit 202 receives software information as exemplified in FIG. 4 and determination information as exemplified in FIG. 5. Next, the information transmitting unit 202 generates setting information based on a set of setting information (exemplified in FIG. 8) including a plurality of types of setting information (step S201). FIG. 8 is a diagram schematically illustrating one example of a configuration of the set of setting information. The set of setting information is stored in the setting information storage unit 204.

The set of setting information exemplified in FIG. 8 includes information where a component's name included in the virtual machine 106, a kind of a component value, an initial value and a maximum value of the component value, a possible component value, a stride ("step" in FIG. 8) of the component value, and a row number when a component value is set to the setting information exemplified in FIG. 3. Note that the set of setting information may include an item other than the above-described items. Further, the set of setting information may not necessarily include all the above-described items.

For example, a first row of the set of setting information exemplified in FIG. 8 indicates a series of values that can be set for an item "the number of processors" being one of components of the virtual machine 106. In this case, the information transmitting unit 202 reads the set of setting information from the setting information storage unit 204, and generates set of setting information in the first row (setting row number) in the setting information (exemplified in FIG. 3) for every processor (step) from one (initial value) to eight (maximum value) for the item "the number of processors". In other words, in this case, the information transmitting unit 202 generates eight types of setting information.

A sixth row of the set of setting information exemplified in FIG. 8 indicates a series of values that can be set for an item "processor's name" being one of components of the virtual machine 106. In this case, the information transmitting unit 202 reads the set of setting information from the setting information storage unit 204, and generates two types of setting information by respectively setting "AAA" and "BBB" read for the item "processor's name" in a second row (setting row number) in the setting information (exemplified in FIG. 3).

When the setting information is generated for the above-described two items, the information transmitting unit 202 generates 16 (=8×2) types of setting information where any two items are combined. In other words, the information transmitting unit 202 generates the setting information by combining components included in the set of setting information.

Next, the information transmitting unit 202 transmits the received determination information (exemplified in FIG. 5), the received software information (exemplified in FIG. 4), and one piece of setting information of the generated setting information to the configuration setting unit 102. In other words, the information transmitting unit 202 (information providing unit) provides the received determination information, the received software information, and one piece of setting information of the generated setting information to the configuration setting unit 102.

Hereinafter, the configuration setting unit 102, the software setting unit 103, the starting unit 104, and the determination unit 105 execute the same processing as the processing indicated in steps S101 to S105 in FIG. 2 (step S202).

Next, the information transmitting unit 202 receives a determination result from the determination unit 105, and generates result information where the received determination result and the setting information transmitted to the configuration setting unit 102 are associated with each other (step S203).

The information transmitting unit 202 executes processing from steps S201 to S203 for the generated setting information (repeated processing from steps S201 to S204), respectively.

Next, the display unit 203 specifies setting information associated with a determination result satisfying a determination-criterion from the generated result information. The display unit 203 displays the specified setting information. For example, as exemplified in FIG. 9, the display unit 203 may display setting information collectively including specified setting information. FIG. 9 is a diagram schematically illustrating one example of setting information displayed on the display unit 203.

The setting information exemplified in FIG. 9 includes two ways of OS_A and OS_B in a section of an operating system (OS). Further, the setting information includes three ways of 2, 3, and 4 in a section of the number of processors. This indicates that setting information satisfying a determination-criterion among the setting information has 6 (=2×3) ways of combination of the OS and the number of processors.

The display unit 203 collectively displays the setting information satisfying the determination-criterion, but the display unit 203 may individually display the setting information satisfying the determination-criterion in accordance with a determination made by the determination unit 105.

Next, advantageous effects of the software determination device 201 according to the second example embodiment will be described.

The software determination device 201 according to the present example embodiment can easily verify an action of target software. Furthermore, the software determination device 201 according to the present example embodiment can easily specify setting information to activate target software among a plurality of pieces of setting information included in a set of setting information.

This reason is Reason 1 and Reason 2. In other words, (Reason 1) The software determination device 201 according to the second example embodiment includes the same configuration as that of the software determination device 101 according to the first example embodiment.

(Reason 2) When the determination unit 105 determines that a determination-criterion holds for each piece of setting information included in the set of setting information (exemplified in FIG. 8), the display unit 203 outputs the setting information. When the determination-criterion holds true, target software runs in the virtual machine 106 set based on the setting information. As a result, the display unit 203 outputs the setting information to activate the target software.

Third Example Embodiment

Next, a third example embodiment of the present invention based on the above-described second example embodiment will be described.

In the following description, while a characteristic part according to the present example embodiment will be mainly described, the same configuration as that of the above-described second example embodiment is denoted by the same reference number, in such a way that redundant description will be omitted.

Figure 10:
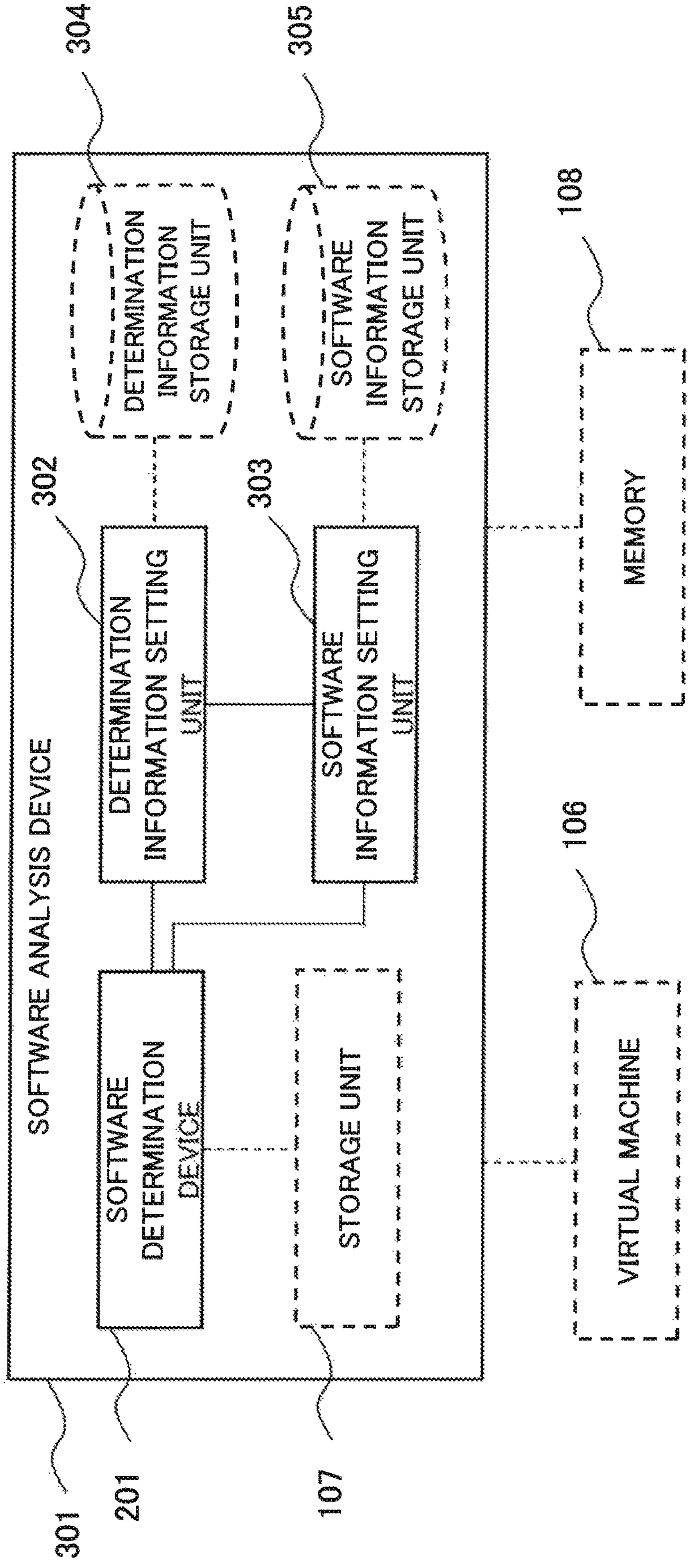
FIG. 10 is a block diagram illustrating a configuration of a software analysis device according to a third example embodiment of the present invention.
Figure 11:
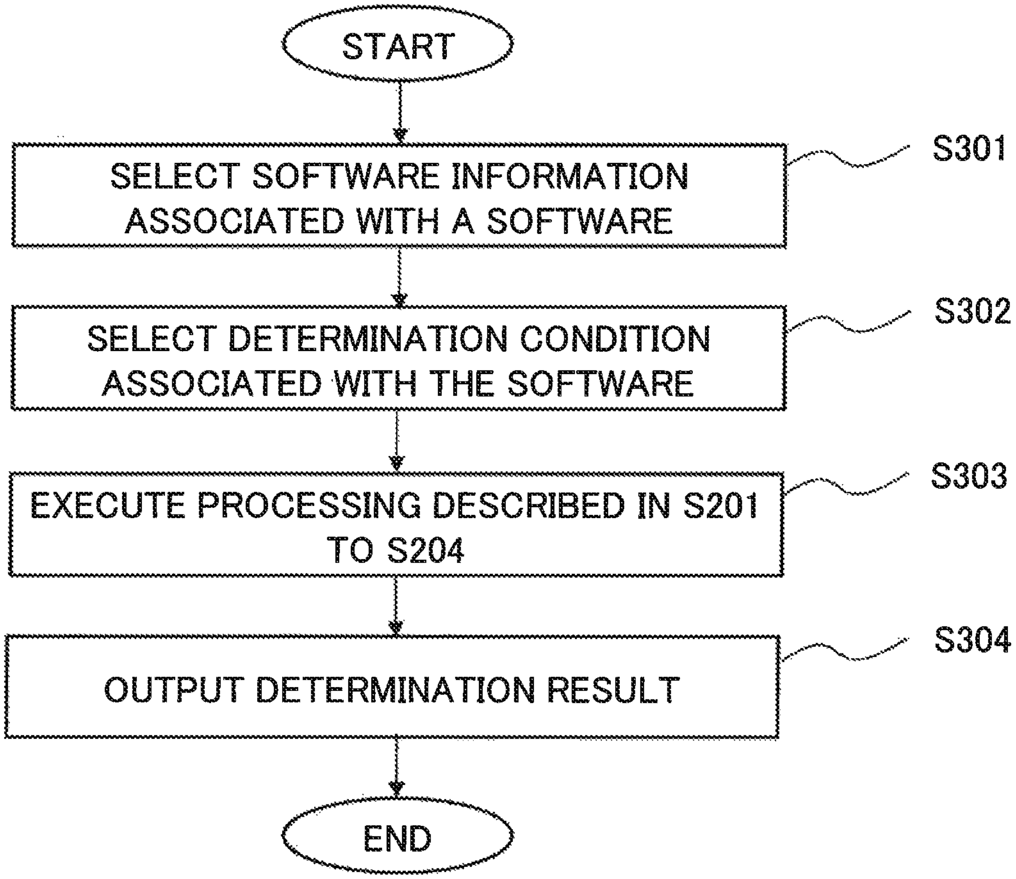
FIG. 11 is a flowchart illustrating a processing flow in the software analysis device according to the third example embodiment.

With reference to FIGS. 10 and 11, a configuration of a software analysis device 301 according to the third example embodiment and processing performed by the software analysis device 301 will be described. FIG. 10 is a block diagram illustrating the configuration of the software analysis device 301 according to the third example embodiment of the present invention. FIG. 11 is a flowchart illustrating a processing flow in the software analysis device 301 according to the third example embodiment. Since the software analysis device 301 is also a device capable of analyzing malware, hereinafter the software analysis device 301 may be referred to as a malware analysis device.

The software analysis device 301 according to the third example embodiment includes a determination information setting unit (determination information setter) 302, a software information setting unit (software information setter) 303, and a software determination device 201. The software analysis device 301 may further include a determination information storage unit 304, a software information storage unit 305, and a storage unit 107.

The software information storage unit 305 stores a software information set including a plurality of types of software information as exemplified in FIG. 12. FIG. 12 is a diagram schematically illustrating one example of a configuration of the software information set.

In the example illustrated in FIG. 12, for example, the software information may associate a software's name "F", a file "FFFF.exe", and a file processing procedure "FFFF.exe is stored in "¥12345"" with each other. This indicates that a virtual machine 106 capable of executing the software "F" by storing "FFFF.exe" in a storage region "¥12345" can be set. The software may be, for example, malware.

The determination information storage unit 304 stores a determination information set including a plurality of types of determination information as exemplified in FIG. 13. FIG. 13 is a diagram schematically illustrating one example of a configuration of the determination information set.

In the determination information set exemplified in FIG. 13, for example, a software's name "F", "dump memory", "virtual machine starts communication", and "is character string "CRYPT ENGINE" present in memory?" are associated with each other. This indicates that when the virtual machine starts communication, a memory dump is generated, and determination is made whether or not the software F is executed based on whether or not the character string "CRYPT ENGINE" is present in the generated memory dump (namely, memory). "CRYPT ENGINE" indicates, for example, an encoding function (program, engine).

Figure 14:
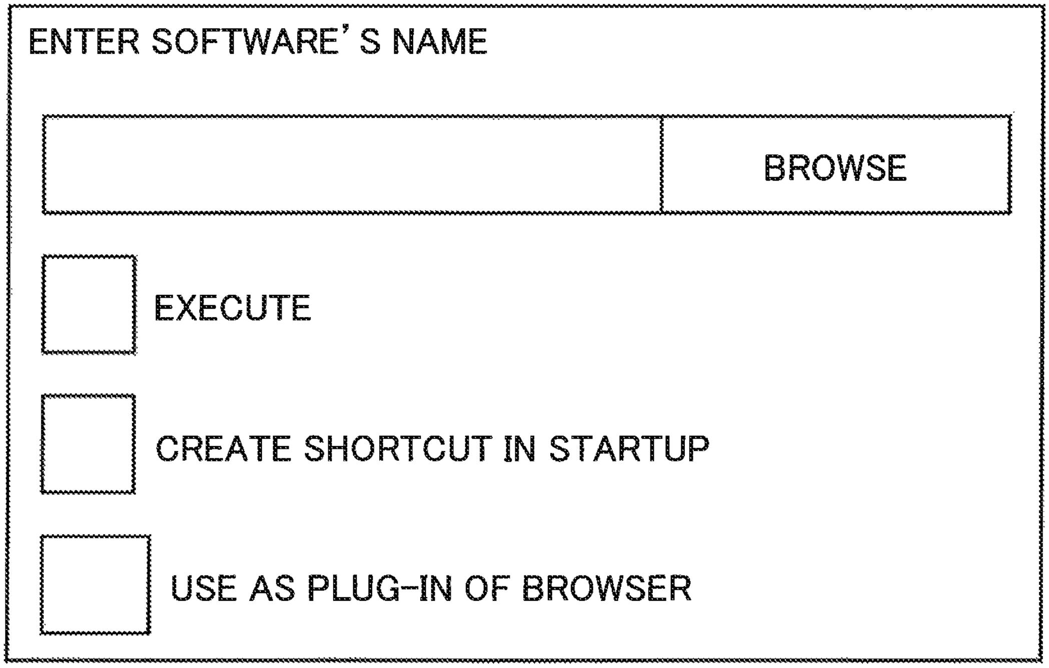
FIG. 14 is a diagram illustrating one example of a user interface according to the third example embodiment.

First, the software information setting unit 303 receives a target software's name or the like via, for example, a user interface (man-machine interface, graphical user interface) as exemplified in FIG. 14. FIG. 14 is a diagram illustrating one example of a user interface according to the third example embodiment.

For example, a user enters a target software's name in an entry of a software's name in a user interface as exemplified in FIG. 14, and then checks a left check box in an "execute" entry and presses a "browse" button. In this way, the software's name and a command for executing the target software are transmitted to the software information setting unit 303.

Next, the software information setting unit 303 selects software information including the received software's name from the software information set by referring to the software information storage unit 305 (step S301). The software information setting unit 303 then transmits (provides) the selected software information to the software determination device 201.

The determination information setting unit 302 selects determination information including the name received by the software information setting unit 303 from the determination information set by referring to the determination information storage unit 304 (step S302). The determination information setting unit 302 then transmits the selected determination information to the software determination device 201.

Next, the software determination device 201 executes the processing from steps S201 to S204 illustrated in FIG. 7 in response to reception of the determination information and the software information (step S303). The software determination device 201 may display a determination result (step S304).

Next, advantageous effects of the software analysis device 301 according to the third example embodiment will be described.

The software analysis device 301 according to the present example embodiment can specify setting information to activate software such as malware that executes a different action depending on setting information, for example. As a result, the software analysis device 301 according to the present example embodiment can provide information for taking a measure against software such as malware, for example.

Fourth Example Embodiment

Next, a fourth example embodiment of the present invention based on the above-described first example embodiment will be described. A software analysis device according to the present example embodiment can analyze target software to be an analysis target based on, for example, a set of setting information (FIG. 18 or 19) similar to the set of setting information as exemplified in FIG. 8.

Figure 15:
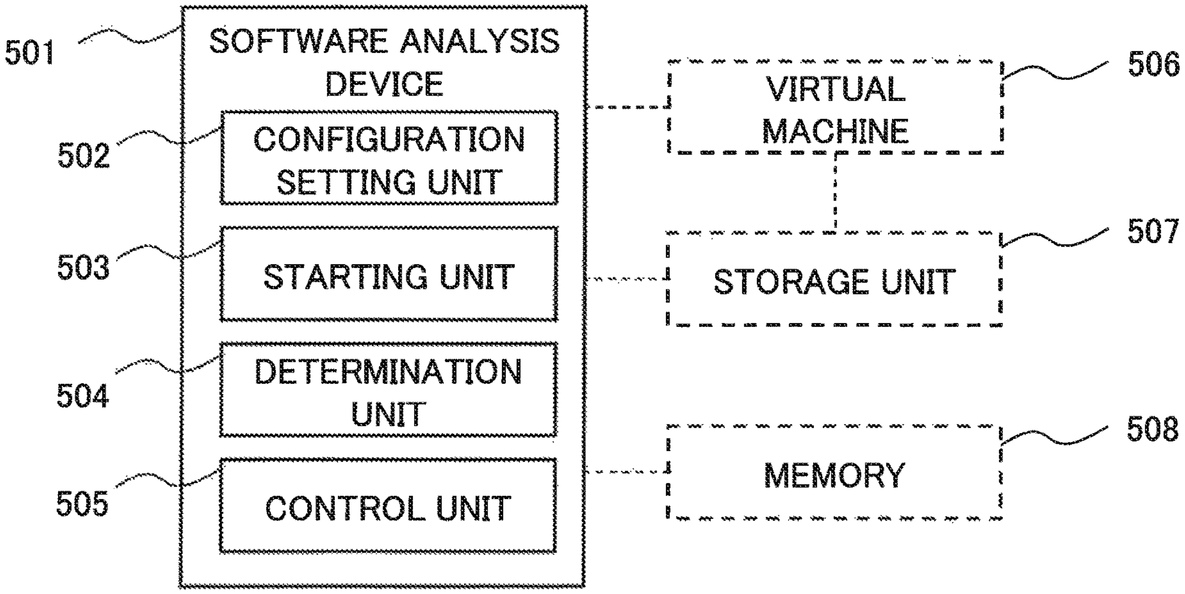
FIG. 15 is a block diagram illustrating a configuration of a software analysis device according to a fourth example embodiment of the present invention.

A configuration of a software analysis device 501 according to the fourth example embodiment of the present invention will be described with reference to FIG. 15. FIG. 15 is a block diagram illustrating the configuration of the software analysis device 501 according to the fourth example embodiment of the present invention.

The software analysis device 501 according to the fourth example embodiment includes a configuration setting unit (configuration setter) 502, a starting unit (starter) 503, a determination unit (determiner) 504, and a control unit (controller) 505.

The software analysis device 501 is communicably connected to a virtual machine 506. The virtual machine 506 includes a storage unit 507 capable of storing information in a non-transitory manner. Data about processing executed in the virtual machine 506 is stored in a memory 508. The data about the processing is, for example, processing data (information) to be a target for processing by software, an execution program indicating the software, and the like.

The configuration setting unit 502 can be achieved by using, for example, a function similar to the function of the configuration setting unit 102 or the like illustrated in FIG. 1. The starting unit 503 can be achieved by using, for example, a function similar to the function of the starting unit 104 or the like illustrated in FIG. 1. The determination unit 504 can be achieved by using, for example, a function similar to the function of the starting unit 104 or the like illustrated in FIG. 1. More specific processing in the software analysis device 501 according to the fourth example embodiment will be described later with reference to FIGS. 16 and 17.

The control unit 505 generates setting information in accordance with a set of setting information as exemplified in FIGS. 18 and 19 (or FIG. 8). FIGS. 18 and 19 are diagrams each schematically illustrating one example of a set of setting information.

In the set of setting information, a component's name is associated with a mode (value) that can be set as a configuration. In the present example embodiment, it is assumed that values of the "component's mode" in the set of setting information are arranged in order in which a mode on which a component may take successively changes or in order in which components are successively arranged in accordance with a certain numerical sequence or the like.

For example, in the set of setting information exemplified in FIG. 18, a component's name "clock frequency" is associated with a component's mode "5, 10, 15, 20, . . . ". This indicates that the control unit 505 successively sets, as a mode, a value of the clock frequency that increases to 5 gigahertz (GHz), 10 (GHz), 15 (GHz), and the like in the setting information (exemplified in FIG. 3) defining a configuration of the virtual machine 506.

For convenience of description, the set of setting information exemplified in FIG. 18 includes only the clock frequency, but the set of setting information may include information about a plurality of components (exemplified in FIGS. 19 and 8). In this case, the control unit 505 generates setting information by fixing a value relating to a component different from a focused component and also successively setting a value relating to the focused component in accordance with the set of setting information. For example, when a focused component is a clock frequency, the control unit 505 successively sets only the clock frequency in accordance with the set of setting information, and generates setting information without changing a value of a component such as the number of processors, an OS, and memory's volume (storage capacity).

A value (mode) set in the column "component's mode" in FIG. 18 will be described. When a component's name is a "processor's name" (FIG. 18), clock frequencies are arranged in order of magnitude of the clock frequency in the column "component's mode". When a component's name is a "processor's name", for example, processor's names are arranged in accordance with an inclusion relation of a command set for the processor in the column "component's mode". Further, when a component's name is an "OS", for example, OS's names are arranged in accordance with a numerical sequence of a version or the like provided to the OS in the column "component's mode". The set of setting information is not limited to the above-described examples.

The set of setting information exemplified in FIG. 19 includes a component's name "clock frequency", a component's name "memory's volume", and a component's name "processor's name". In this case, the software analysis device executes processing described later with reference to FIG. 21 or the like, for example, relating to a name of each piece of component information in the set of setting information.

In the following description, it is assumed for convenience of description that software is previously set in the storage unit 507 based on software information as exemplified in FIG. 4. In other words, it is assumed that a file relating to software is previously set in the storage unit 507 in accordance with a "file setting order" associated with the file. Further, only the "clock frequency" is described in the set of setting information exemplified in FIG. 18, but it is assumed that the control unit 505 also sets a value (mode) relating to a component (for example, memory's volume) different from the clock frequency.

Figure 16:
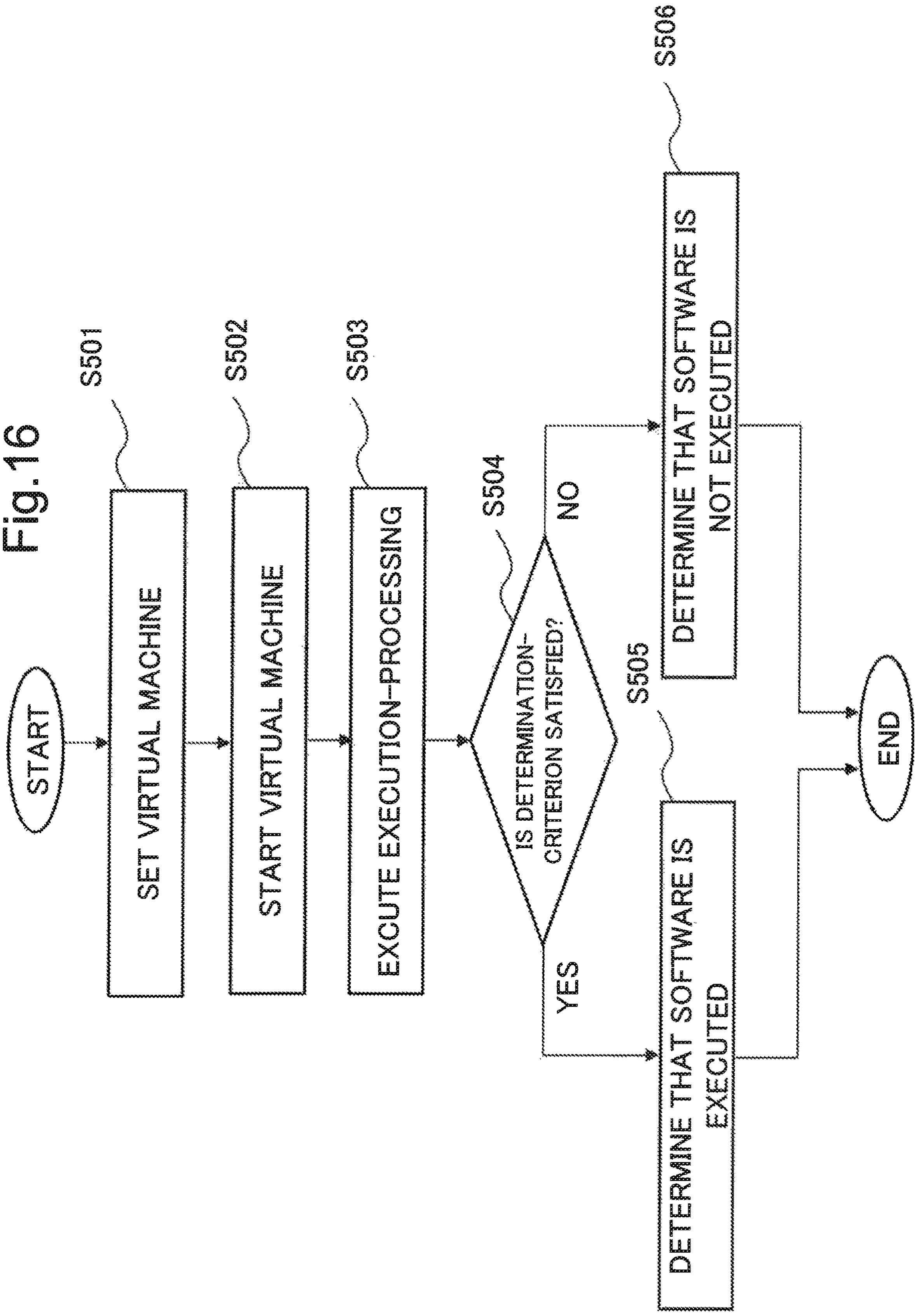
FIG. 16 is a flowchart illustrating a processing flow in a configuration setting unit, a starting unit, and a determination unit in the software analysis device according to the fourth example embodiment.
Figure 17:
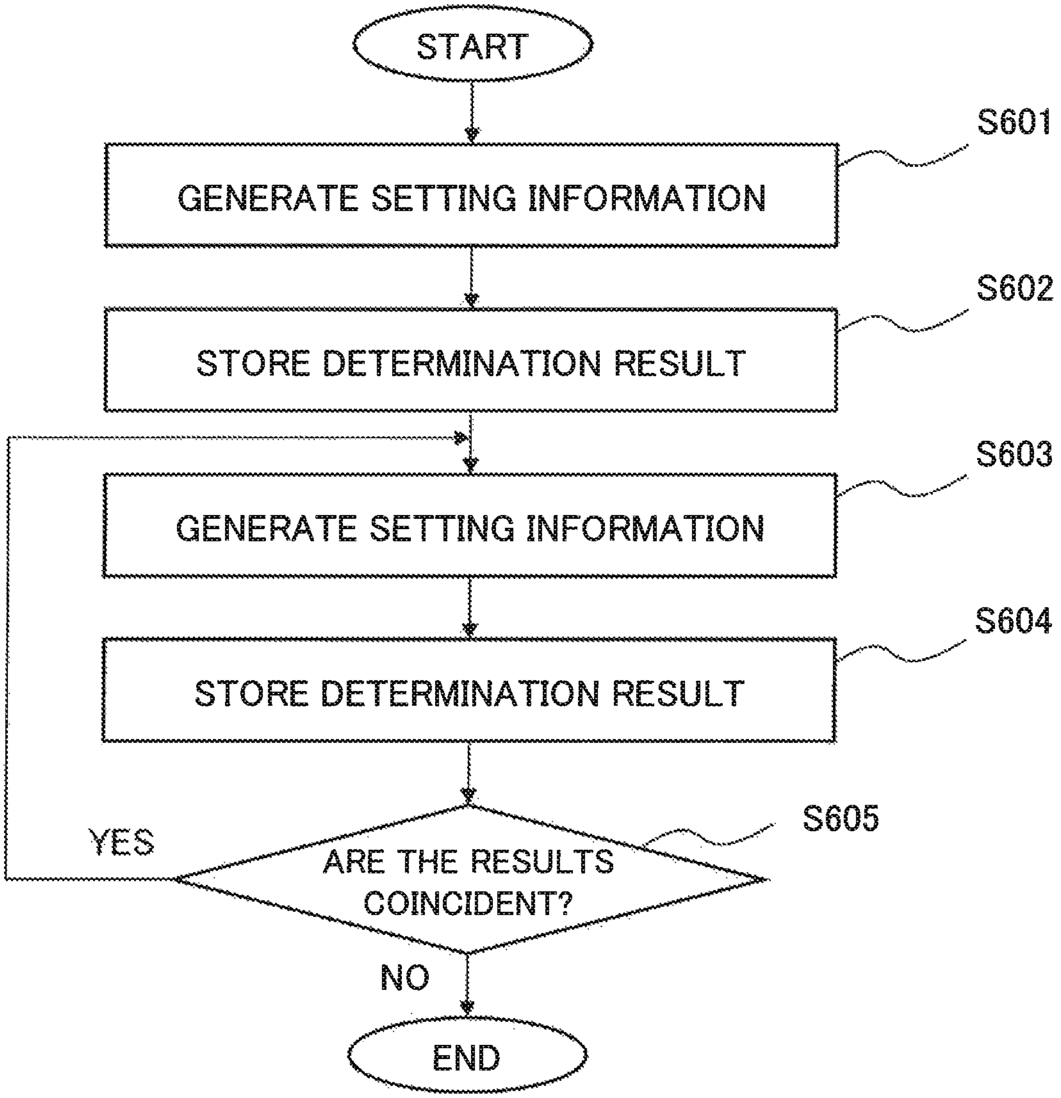
FIG. 17 is a flowchart illustrating a processing flow of a control unit in the software analysis device according to the fourth example embodiment.

Next, processing in the software analysis device 501 according to the fourth example embodiment will be described with reference to FIGS. 16 and 17. FIG. 16 is a flowchart illustrating a processing flow in the configuration setting unit 502, the starting unit 503, and the determination unit 504 in the software analysis device 501 according to the fourth example embodiment. FIG. 17 is a flowchart illustrating a processing flow of the control unit 505 in the software analysis device 501 according to the fourth example embodiment.

First, the control unit 505 reads a component's name and a first value (mode) in modes relating to the component from a set of setting information as exemplified in FIG. 18. The control unit 505 generates setting information in which the value read as a mode of the component is set (step S601).

When the configuration setting unit 502 receives setting information as exemplified in FIG. 3, the configuration setting unit 502 sets a configuration of the virtual machine 506 based on the received information (step S501). As mentioned above, the setting information is information indicating one mode relating to a configuration of the virtual machine 506. In other words, the configuration setting unit 502 sets the virtual machine 506 that is a mode in accordance with the setting information and includes the storage unit 507 storing target software as a component.

The starting unit 503 starts the virtual machine 506 set by the configuration setting unit 502 (step S502).

The determination unit 504 executes, at timing included in the determination information, execution-processing associated with the timing based on the determination information exemplified in FIG. 5 (step S503).

Next, while referring to a result of the execution-processing, the determination unit 504 determines whether or not the target software is executed in the virtual machine 506 based on a determination-criterion associated with the execution-processing (step S504). When the determination unit 504 determines that a result of the execution-processing satisfies the determination-criterion (YES in step S504), the determination unit 504 determines that the target software is executed (step S505). When the determination unit 105 determines that a result of the execution-processing does not satisfy the determination-criterion (NO in step S504), the determination unit 105 determines that the target software is not executed (step S506).

The control unit 505 stores a determination result for the target software by the determination unit 504 in the storage unit (not illustrated) (step S602). Next, the control unit 505 reads a component's name and a second value (mode) in the modes relating to the component from the set of setting information as exemplified in FIG. 18. The control unit 505 generates setting information in which the value read as a mode of the component is stored (step S603).

The configuration setting unit 502, the starting unit 503, and the determination unit 504 execute processing similar to the processing illustrated in FIG. 16 based on the setting information generated by the control unit 505.

The control unit 505 stores a determination result for the target software by the determination unit 504 in the storage unit (not illustrated) (step S604). The control unit 505 determines whether or not the determination result stored in step S602 is coincident with the determination result stored in step S604 (step S605). In other words, the control unit 505 determines whether or not the determination result calculated for the first value in the column "component's mode" in the set of setting information is coincident with the determination result calculated for the second value.

When the two determination results are coincident with each other (YES in step S605), the control unit 505 reads a component's name and a third value (mode) in the modes relating to the component from the set of setting information as exemplified in FIG. 18. The control unit 505 generates setting information in which the value read as a mode of the component is set (step S603). The configuration setting unit 502, the starting unit 503, and the determination unit 504 execute processing similar to the processing illustrated in FIG. 16 based on the setting information generated by the control unit 505. Next, the control unit 505 determines whether or not the determination result calculated for the second value in the column "component's mode" in the set of setting information is coincident with the determination result calculated for the third value (step S605).

Hereinafter, the control unit 505 determines whether or not a determination result calculated for an $I^{th}$ (however, I indicates a natural number less than or equal to (the number of modes−1) illustrated in FIG. 18) value is coincident with a determination result calculated for a $(I+1)^{th}$ value by executing the same processing (step S605).

On the other hand, in a case where the two determination results are not coincident with each other (NO in step S605), the control unit 505 terminates the processing.

In other words, the control unit 505 calculates modes having different determination results of two consecutive modes in the set of setting information by the processing indicated in steps S603 to S605. In the case of NO in step S605, the control unit 505 may output any mode used as a base for the determination result compared in step S605.

In FIG. 17, the processing of determining whether or not determination results are coincident with each other may be determination processing (Determination 1 or Determination 2 below) executed by the control unit 505 for two consecutive modes in a set of setting information.

(Determination 1) Target software does not run in the virtual machine 506 having a component in accordance with setting information previously generated, and runs in the virtual machine 506 having a component in accordance with setting information subsequently generated.

(Determination 2) Target software runs in the virtual machine 506 having a component in accordance with setting information previously generated, and does not run in the virtual machine 506 having a component in accordance with setting information subsequently generated.

Next, advantageous effects of the software analysis device 501 according to the fourth example embodiment will be described.

The software analysis device 501 according to the fourth example embodiment can easily verify whether or not target software runs in a certain machine environment. The reason is that the software analysis device 501 according to the fourth example embodiment includes a configuration similar to that of the software determination device 101 according to the first example embodiment.

Furthermore, the software analysis device 501 according to the fourth example embodiment can efficiently analyze (specify) a machine environment to activate target software. In other words, the software analysis device 501 according to the fourth example embodiment can efficiently estimate a boundary between a mode (machine environment) to activate target software and a mode (machine environment) not to activate the target software run among a plurality of modes included in a set of setting information. Details of this reason will be described below.

It is assumed that target software runs when memory's volume (storage capacity) is greater than or equal to a certain volume, and the target software does not run when the memory's volume is less than the certain volume. It is further assumed that a numerical sequence in which component's modes relating to memory's volume are arranged in ascending order of the volume in accordance with a numerical sequence indicating the memory's volume is previously set in a set of setting information.

In this case, the software analysis device 501 determines whether or not the target software is executed in the virtual machine 506 in ascending order of volume of a memory thereof in accordance with processing as illustrated in FIGS. 16 and 17. The software analysis device 501 outputs modes having different determination results of two modes adjacent to each other by the processing. Target software changes whether to run with "a certain volume" for memory's volume as a threshold value, in such a way that the software analysis device 501 can estimate the boundary based on each value set in a "component's mode" in the set of setting information exemplified in FIG. 18.

In the "component's mode" in the set of setting information, a mode predicted that target software will not be executed in the virtual machine 506 may be previously arranged first in such a way as to be processed first while a mode predicted that target software will be executed may be previously arranged subsequently in such a way as to be processed subsequently. By generating the set of setting information in such a manner, the control unit 505 can, for example, find a mode in which the target software is executed from a determination result in the determination unit 504 and thus execute processing similar to the processing illustrated in FIG. 17. In this case, the control unit 505 does not need to execute the processing of storing the determination result as indicated in step S602 or S604.

Furthermore, description is given to advantageous effects achieved when, in the set of setting information, a mode predicted that target software will not be executed is arranged first in such a way as to be processed first while a mode predicted that target software will be executed is arranged subsequently in such a way as to be processed subsequently. Malicious target software such as malware is often made to run in various machine environments. When target software is made to run in various machine environments, a machine environment in which the target software runs has more varieties than a machine environment in which the target software does not run. In this case, an effect capable of reducing the number of times for repeating the processing in steps S603 to S605 (FIG. 17) is achieved by arranging each mode as described above in the set of setting information. In other words, the software analysis device 501 according to the present example embodiment achieves an advantageous effect capable of analyzing a machine environment in which target software runs easily and in a short period of time. The arrangement achieving this effect is, for example, arrangement indicated by Arrangement 1 to Arrangement 6 as follows.

(Arrangement 1) The number of processors is arranged in ascending order, (Arrangement 2) memory's volume is arranged in ascending order, (Arrangement 3) display resolution (vertical) is arranged in ascending order, (Arrangement 4) display resolution (horizontal) is arranged in ascending order, (Arrangement 5) a processor's name is arranged such that the number of command sets relating to the processor is arranged in ascending order, and (Arrangement 6) an OS is arranged such that a version provided to the OS is arranged in chronological order.

(Arrangement 7) Clock frequency is arranged in ascending order.

The software analysis device 501 may determine whether or not target software is executed in each of a first mode and a last mode among modes stored in the "component's mode" section in the set of setting information. In this case, when target software relating to the last mode is not executed and target software relating to the first mode is executed, the software analysis device 501 executes processing of reversing the front and back of the arrangement in the "component's mode" section and then executes the processing illustrated in FIGS. 16 and 17. Even when it cannot be predicted whether or not target software runs in the virtual machine 506, the software analysis device 501 achieves advantageous effect capable of verifying a machine environment in which the target software runs easily and in a short period of time.

Fifth Example Embodiment

Next, a fifth example embodiment of the present invention based on the above-described fourth example embodiment will be described.

Figure 20:
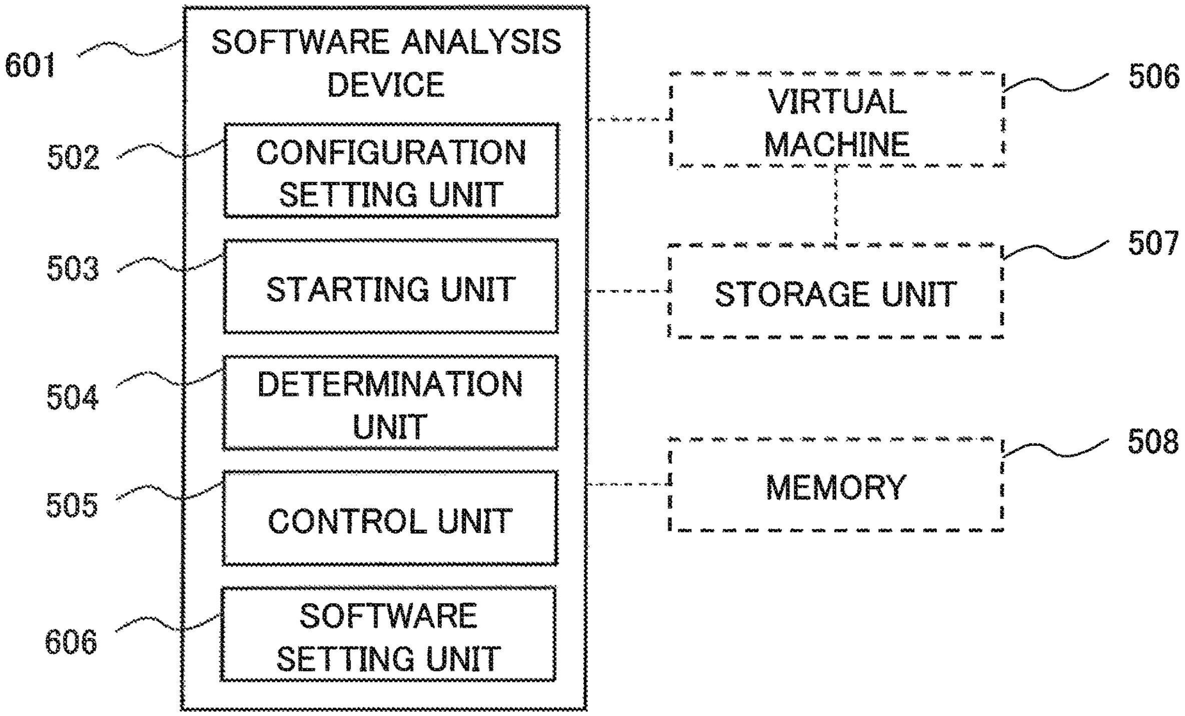
FIG. 20 is a block diagram illustrating a configuration of a software analysis device according to a fifth example embodiment of the present invention.

A configuration of a software analysis device 601 according to the fifth example embodiment of the present invention will be described with reference to FIG. 20. FIG. 20 is a block diagram illustrating the configuration of the software analysis device 601 according to the fifth example embodiment of the present invention.

The software analysis device 601 according to the fifth example embodiment includes a configuration setting unit (configuration setter) 502, a starting unit (starter) 503, a determination unit (determiner) 504, a control unit (controller) 505, and a software setting unit (software setter) 606.

The software analysis device 601 is communicably connected to a virtual machine 506. The virtual machine 506 includes a storage unit 507 capable of storing information in a non-transitory manner. Data about processing executed in the virtual machine 506 is stored in a memory 508. The data about the processing is, for example, processing data (information) to be a target for processing by software (target software), an execution program indicating the software, and the like.

The software setting unit 606 can be achieved by using, for example, the configuration setting unit 102 illustrated in FIG. 1.

Figure 21:
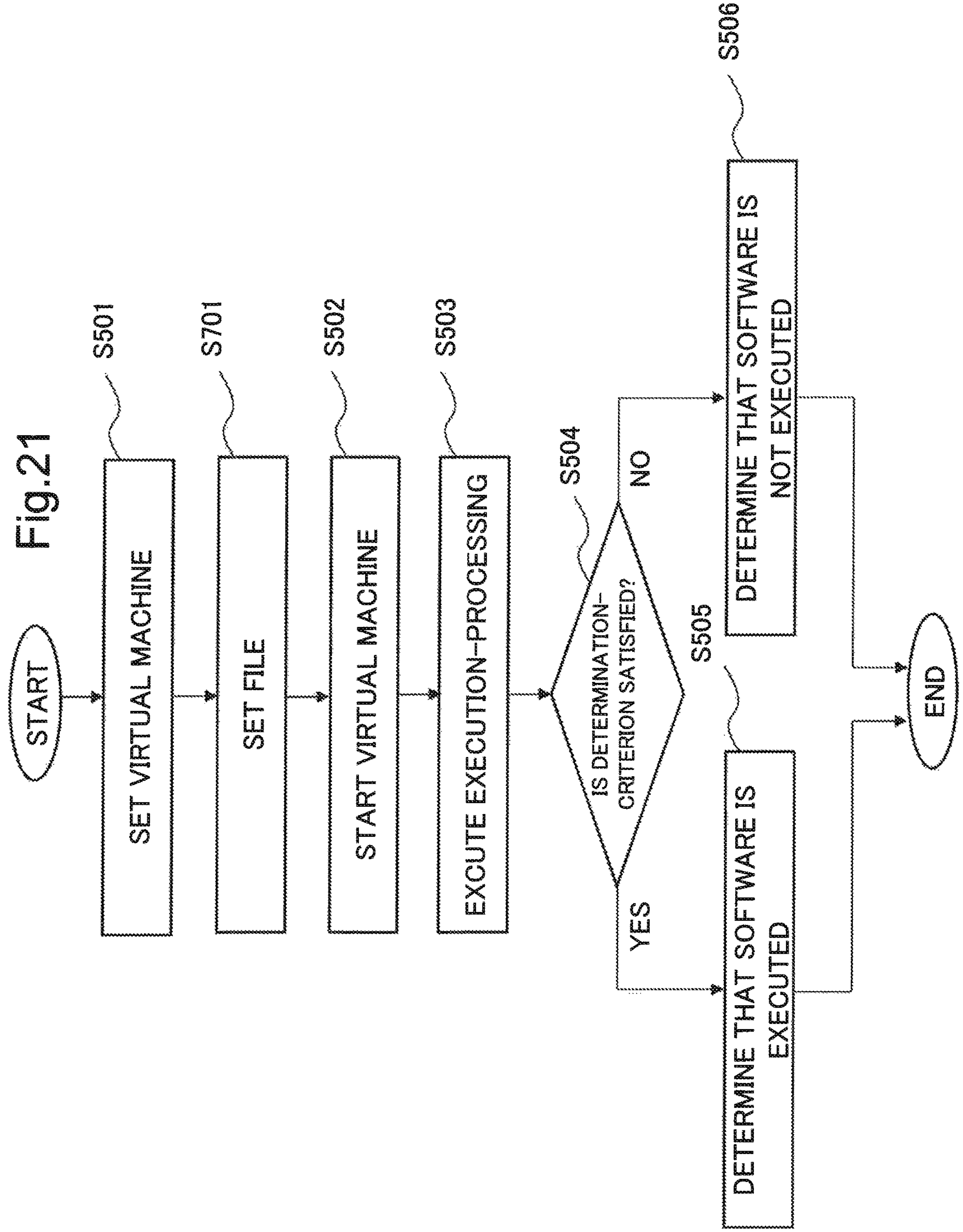
FIG. 21 is a flowchart illustrating a processing flow in the software analysis device according to the fifth example embodiment.

Next, processing in the software analysis device 601 according to the fifth example embodiment will be described with reference to FIG. 21. FIG. 21 is a flowchart illustrating a processing flow in the software analysis device 601 according to the fifth example embodiment.

The control unit 505 generates setting information by executing processing indicated in step S501 in FIG. 17. When the configuration setting unit 502 receives setting information as exemplified in FIG. 3, the configuration setting unit 502 sets a component included in the virtual machine 506 based on the received setting information (step S501).

Next, the software setting unit 606 sets, in accordance with a procedure included in the software information exemplified in FIG. 4, a file associated with the procedure in the storage unit 507 being one of the components of the virtual machine 506 (step S701). As a result, the virtual machine 506 reads the file set in the software setting unit 606 from the storage unit 507 and executes the read file. The virtual machine 506 can start the target software after the above-described processing.

Next, the starting unit 503 starts the virtual machine 506 (step S502). Hereinafter, the software analysis device 601 executes the processing indicated in steps S503 to S506 and the processing indicated in steps S603 to S605 (FIG. 17).

When software information includes a plurality of software's names, the software analysis device 601 executes the processing illustrated in FIGS. 17 and 21 for individual software in the software information (namely, each target software).

Next, advantageous effects of the software analysis device 601 according to the fifth example embodiment will be described.

The software analysis device 601 according to the fifth example embodiment can efficiently analyze (specify) a machine environment to activate target software. The reason is that the software analysis device 601 according to the fifth example embodiment has a configuration similar to that of the software analysis device 501 according to the fourth example embodiment.

Furthermore, the software analysis device 601 according to the fifth example embodiment achieves advantageous effect similar to the above-described effect of each target software even in the presence of a plurality of target software. In other words, the software analysis device 601 can estimate a boundary between a mode to activate target software and a mode not to activate the target software among a plurality of modes included in a set of setting information for each target software. The reason is that the software setting unit 606 sets, in accordance with a file setting procedure associated with the target software, a file relating to the target software in the storage unit 507 by referring to software information (exemplified in FIG. 4).

(Hardware Configuration Example)

A configuration example of hardware resources that realize a software determination device, a software analysis device, and a malware diagnosis device according to each example embodiment of the present invention will be described. However, the software determination device, the software analysis device, and the malware diagnosis device may be realized using physically or functionally at least two calculation processing devices. Further, the software analysis device or the coding device may be realized as a dedicated apparatus.

Figure 22:
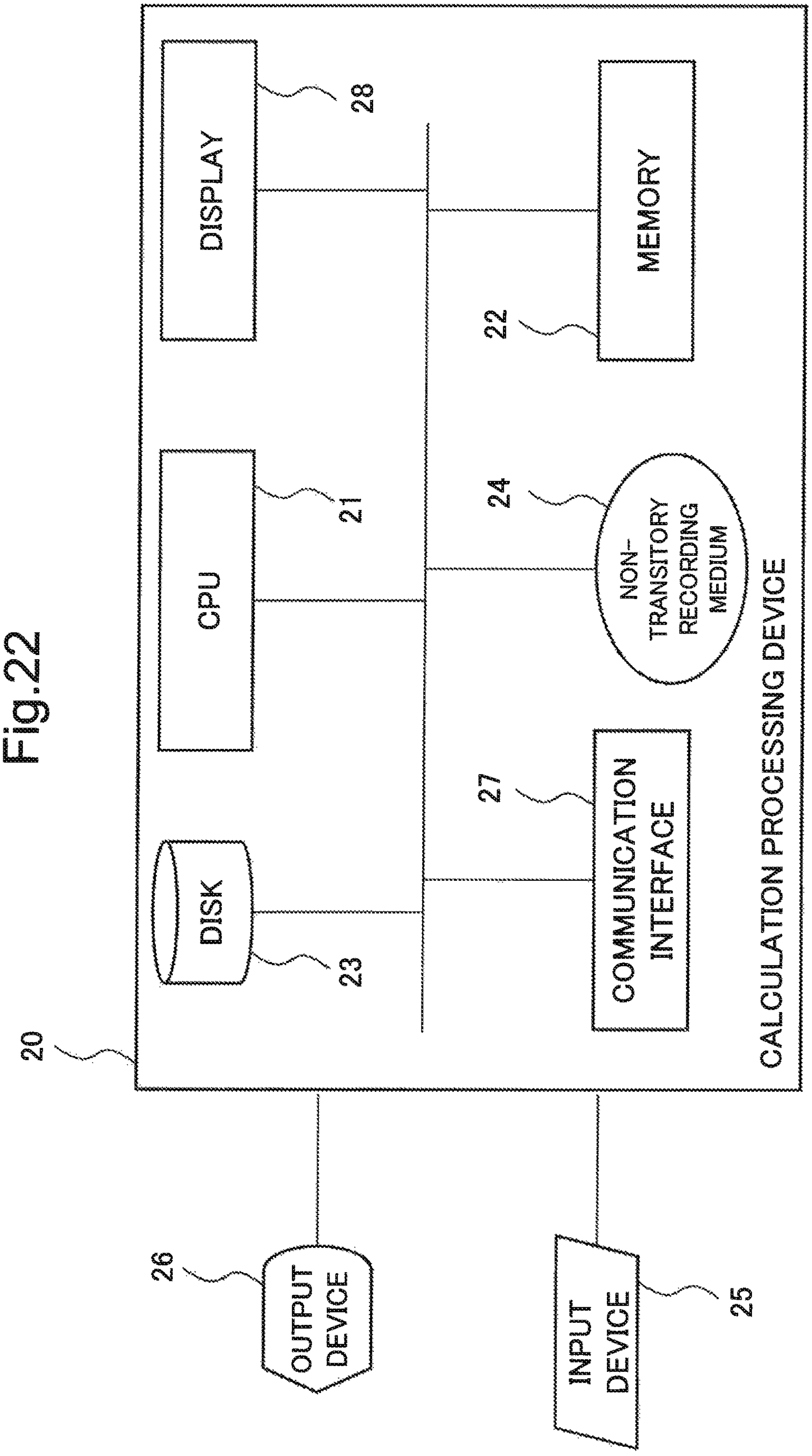
FIG. 22 is a block diagram schematically illustrating a hardware configuration of a calculation processing device capable of realizing the software determination device and the like according to each example embodiment of the present invention.

FIG. 22 is a block diagram schematically illustrating a hardware configuration of a calculation processing device capable of realizing the software determination device, the software analysis device, and the malware diagnosis device according to the each example embodiments of the present invention. A calculation processing device 20 includes a central processing unit (CPU) 21, a memory 22, a disk 23, a non-transitory recording medium 24, a communication interface (hereinafter, expressed as. "communication I/F") 27 and a display 28. The calculation processing device 20 may connect an input device 25 and an output device 26. The calculation processing device 20 can execute transmission/reception of information to/from another calculation processing device and a communication apparatus via the communication I/F 27.

The non-transitory recording medium 24 is, for example, a computer-readable Compact Disc, Digital Versatile Disc. The non-transitory recording medium 24 may be Universal Serial Bus (USB) memory, Solid State Drive or the like. The non-transitory recording medium 24 allows a related program to be holdable and portable without power supply. The non-transitory recording medium 24 is not limited to the above-described media. Further, a related program can be carried via a communication network by way of the communication I/F 27 instead of the non-transitory recording medium 24.

In other words, the CPU 21 copies, on the memory 22, a software program (a computer program: hereinafter, referred to simply as a "program") stored by the disk 23 when executing the program and executes arithmetic processing. The CPU 21 reads data necessary for program execution from the memory 22. When display is needed, the CPU 21 displays an output result on the display 28. When a program is input from the outside, the CPU 21 reads the program from the input device 25.

The CPU 21 interprets and executes a software determination program (FIG. 2, or FIG. 7), a software analysis program (FIG. 11, FIG. 16, FIG. 17, or FIG. 21) present on the memory 22 corresponding to a function (processing) indicated by each unit illustrated in FIG. 1, FIG. 6, FIG. 10, FIG. 15 or FIG. 20 described above. The CPU 21 sequentially executes the processing described in each example embodiment of the present invention.

In other words, in such a case, it is conceivable that the present invention can also be made using the software determination program, the software analysis program or the malware diagnosis program. Further, it is conceivable that the present invention can also be made using a computer-readable, non-transitory recording medium storing the software determination program, the software analysis program or the malware diagnosis program.

The present invention has been described using the above-described example embodiments as example cases. However, the present invention is not limited to the above-described example embodiments. In other words, the present invention is applicable with various aspects that can be understood by those skilled in the art without departing from the scope of the present invention.

This application is based upon and claims the benefit of priority from Japanese patent application No. 2015-233604, filed on Nov. 30, 2015, the disclosure of which is incorporated herein in its entirety.

REFERENCE SIGNS LIST

101 software determination device
102 configuration setting unit
103 software setting unit
104 starting unit
105 determination unit
106 virtual machine
107 storage unit
108 memory
201 software determination device
202 information transmitting unit
203 display unit
204 setting information storage unit
301 software analysis device
302 determination information setting unit
303 software information setting unit
304 determination information storage unit
305 software information storage unit
20 calculation processing device
21 CPU
22 memory
23 disk
24 non-transitory recording medium
25 input device
26 output device
27 communication interface
28 display
501 software analysis device
502 configuration setting unit
503 starting unit
504 determination unit
505 control unit
506 virtual machine
507 storage unit
508 memory
601 software analysis device
606 software setting unit

What is claimed is:

1. A software analysis device comprising:

a configuration setter configured to set, in accordance with setting information indicating that one mode is set to a configuration of a virtual machine, the configuration of the virtual machine including at least a storage unit where a file required to execute target software is stored in a predetermined storage region;

a starter configured to start the set virtual machine;

a determiner configured to execute, based on determination information, an execution-processing to be executed at a timing, determine whether or not an executed result satisfies a determination-criterion, determine that the target software is executed in the virtual machine when the determination-criterion is satisfied, and determine that the target software is not executed in the virtual machine when the determination-criterion is not satisfied, the determination information where execution-processing outside the virtual machine in processing of determining whether or not the target software is executed, the timing of the execution-processing, and the determination-criterion indicating a condition of the determination are associated with each other; and a controller configured to control the configuration setter to set, among a set of setting information where modes on which configurations may take is arranged in order of successive change, a certain mode to the setting information, control the configuration setter to set, based on the set of setting information, a next mode of the certain mode to the setting information, and output, when a determination result from the determiner relating to the certain mode and a determination result from the determiner relating to the next mode are different with each other, the certain mode or the next mode.

2. The software analysis device according to claim 1 further comprising:

a software setter configured to set, in accordance with a procedure included in software information where at least one or more files required to execute target software and the procedure of setting the file into the virtual machine are associated with each other, the file into the storage unit, wherein the configuration setter sets the virtual machine having the configuration including the storage set by the software setter.

3. The software analysis device according to claim 1, wherein the controller outputs, when the determination result indicates that the target software is not executed for the certain mode and the determination result indicates that the target software is executed for a next mode after the certain mode, the next mode after the certain mode.

4. The software determination device according to claim 1, wherein, when a plurality of pieces of the determination information that differ in the execution-processing are provided for the target software, the determiner determines each piece of determination information included in a plurality of pieces of the determination information.

5. The software analysis device according to claim 1 further comprising:

a setting information storage configured to store the set of setting information.

6. The software analysis device according to claim 5, wherein the set of setting information includes, as the mode, information in which a value indicating a capacity of a memory included in the virtual machine is arranged in ascending order.

7. The software analysis device according to claim 5, wherein the set of setting information includes, as the mode, information in which a name of a processor is arranged in ascending order of a number of executable commands by the processor included in the virtual machine.

8. The software analysis device according to claim 5, wherein the set of setting information includes, as the mode, information in which a number of processors included in the virtual machine is arranged in ascending order.

9. A software analysis method comprising:

setting, in accordance with setting information indicating that one mode is set to a configuration of a virtual machine, the configuration of the virtual machine including at least a storage unit where a file required to execute target software is stored in a predetermined storage region;

starting the set virtual machine;

executing, based on determination information, an execution-processing to be executed at a timing, determining whether or not an executed result satisfies a determination-criterion, determining that the target software is executed in the virtual machine when the determination-criterion is satisfied, and determining that the target software is not executed in the virtual machine when the determination-criterion is not satisfied, the determination information where execution-processing outside the virtual machine in processing of determining whether or not the target software is executed, the timing of the execution-processing, and the determination-criterion indicating a condition of the determination are associated with each other; and controlling to set, among a set of setting information where modes on which configurations may take is arranged in order of successive change, a certain mode to the setting information, controlling to set, based on the set of setting information, a next mode of the certain mode to the setting information, and outputting, when a determination result relating to the certain mode and a determination result relating to the next mode are different with each other, the certain mode or the next mode.

10. A non-transitory recording medium storing a software analysis program recorded therein, the program making a computer achieve:

a configuration setting function configured to set, in accordance with setting information indicating that one mode is set to a configuration of a virtual machine, the configuration of the virtual machine including at least a storage unit where a file required to execute target software is stored in a predetermined storage region;

a starting function configured to start the set virtual machine;

a determination function configured to execute, based on determination information, an execution-processing to be executed at a timing, determine whether or not an executed result satisfies a determination-criterion, determine that the target software is executed in the virtual machine when the determination-criterion is satisfied, and determine that the target software is not executed in the virtual machine when the determination-criterion is not satisfied, the determination information where execution-processing outside the virtual machine in processing of determining whether or not the target software is executed, the timing of the execution-processing, and the determination-criterion indicating a condition of the determination are associated with each other; and a control function configured to control the configuration setting function to set, among a set of setting information where modes on which configurations may take is arranged in order of successive change, a certain mode to the setting information, control the configuration setting function to set, based on the set of setting information, a next mode of the certain mode to the setting information, and output, when a determination result from the determination function relating to the certain mode and a determination result from the determination function relating to the next mode are different with each other, the certain mode or the next mode.

* * * * *